(12) United States Patent
Lee et al.

(10) Patent No.: US 7,373,113 B2
(45) Date of Patent: May 13, 2008

(54) FREQUENCY GENERATION APPARATUS AND METHOD FOR DATA TRANSMISSION

(75) Inventors: Woo-Kyung Lee, Suwon-si (KR); Wan-jin Kim, Seoul (KR)

(73) Assignees: Samsung Electronics Co., Ltd., Suwon (KR); Staccato Communications, Inc., San Diego, CA (US)

( * ) Notice: Subject to any disclaimer, the term of this patent is extended or adjusted under 35 U.S.C. 154(b) by 394 days.

(21) Appl. No.: 10/978,361

(22) Filed: Nov. 2, 2004

(65) Prior Publication Data

US 2005/0143041 A1 Jun. 30, 2005

(30) Foreign Application Priority Data

Dec. 31, 2003 (KR) ...................... 10-2003-0101263

(51) Int. Cl.
  *H04B 1/40* (2006.01)
(52) U.S. Cl. ..................... 455/75; 455/313; 455/552.1; 327/119
(58) Field of Classification Search ................ 455/313, 455/323, 84, 86, 75, 76, 165.1, 260, 255, 455/266, 259, 74; 375/130, 376; 327/105, 327/107, 119, 120, 121, 156, 159; 331/2, 331/31, 46, 49, 74, 179, 56
  See application file for complete search history.

(56) References Cited

U.S. PATENT DOCUMENTS

| | | | | |
|---|---|---|---|---|
| 5,757,240 A | * | 5/1998 | Boerstler et al. | 331/34 |
| 6,005,446 A | * | 12/1999 | Galani et al. | 331/41 |
| 6,177,845 B1 | * | 1/2001 | Moll | 331/49 |
| 6,295,020 B1 | * | 9/2001 | Koechlin | 342/175 |
| 6,833,764 B1 | * | 12/2004 | Dean | 331/2 |
| 2001/0016480 A1 | * | 8/2001 | Okanobu | 455/318 |
| 2002/0119759 A1 | * | 8/2002 | Hahn | 455/77 |
| 2004/0174928 A1 | * | 9/2004 | Siwiak et al. | 375/146 |
| 2004/0253935 A1 | * | 12/2004 | Drentea | 455/314 |

(Continued)

FOREIGN PATENT DOCUMENTS

EP   1006669 A1 * 6/2000

(Continued)

OTHER PUBLICATIONS

Batra, et al."Multi-Band OFDM Physical Layer Proposal for IEEE 802.15 Task Group 3a", Sep. 2003, pp. 34-35. IEEE [online] Retreived from: Internet<grouper.ieee.org/groups/802/15/pub/2003/Jul03/03268r1P802-15_TG3a-Multi-band-CFP-Document.doc>.*

(Continued)

*Primary Examiner*—Quochien B. Vuong
(74) *Attorney, Agent, or Firm*—Sughrue Mion PLLC

(57) ABSTRACT

A reference frequency generation method and apparatus for communication systems that transmit and receive data by use of an ultra wide band of at least two frequency groups having at least two reference frequencies. The method and apparatus generate the reference frequencies by generating generation frequencies by use of a frequency generated from the local oscillator, and generating adjustment frequencies for adjusting the generation frequency. One generation frequency and one adjustment frequency are selected from the generation frequencies and adjustment frequencies, and the reference frequencies are generated by use of the selected generation frequency and adjustment frequency.

14 Claims, 5 Drawing Sheets

U.S. PATENT DOCUMENTS

2005/0013344 A1* 1/2005 Abdellaoui et al. ......... 375/130
2005/0282514 A1* 12/2005 Kang et al. ................. 455/313
2006/0251148 A1* 11/2006 Welbom et al. ............ 375/130

FOREIGN PATENT DOCUMENTS

JP      6-45930 A     2/1994

JP      2005198304 A * 7/2005

OTHER PUBLICATIONS

Batra et al. "Multi-Band OFDM Physical Layer Proposal for IEEE 802.15 Task Group 3a", Jul. 2003, pp. 34-35. IEEE [online] Retrieved from: Internet<grouper.ieee.org/802/15/pub/2003/Jul03/03268r0P802-15_TG3a-Multi-band-CFP-Document.doc>.*

* cited by examiner

FREQUENCY GENERATION APPARATUS AND METHOD FOR DATA TRANSMISSION

CROSS-REFERENCE TO RELATED APPLICATIONS

This application claims benefit under 35 U.S.C. § 119 from Korean Patent Application No. 2003-101263; filed on Dec. 31, 2003, the entire content of which is incorporated herein by reference.

BACKGROUND OF THE INVENTION

1. Field of the Invention

The present invention relates to frequency bands for communication systems, and more particularly to a method for transmitting and receiving data by use of multiple bands.

2. Description of the Related Art

In general, communication systems use a certain frequency band to transmit data. The data used for the communication systems is divided into circuit data and packet data. The circuit data is data such as voice signals that has to be transmitted and received in real time, whereas the packet data has a data amount of over a certain size such as packet information and does not have to be transmitted at real time. The frequency band used for transmission of the circuit data is narrow in general. However, a wider frequency band is required to transmit the packet data.

As stated above, the frequency band to be used also increases as an amount of data to be transmitted increases. Hereinafter, the wider frequency band is referred to as the ultra wide band (UWB). The UWB is divided into plural frequency sub-bands each having a certain size. The communication system transmits data using the plural frequency sub-bands in a specific period of time, so a lot of data can be transmitted for the specific period of time. The communication system selects one of the plural frequency sub-bands for the specific period of time, and transmits data using the selected frequency sub-band, to thereby enhance data security. That is, the communication system can enhance data security by sequentially using the plural frequency sub-bands.

FIG. 1 is a view for showing a structure of the UWB currently proposed. As shown in FIG. 1, the frequency band of the currently proposed UWB lies in a frequency range from 3432 MHz to 10032 MHz. The frequency band of the UWB largely consists of four groups denoted as group A to group D, with group D having four frequency sub-groups.

The reference frequencies of three frequency sub-bands of group A are 3432 MHz, 3960 MHz, and 4488 GHz, and the reference frequencies of two frequency sub-bands of group B are 5016 MHz and 5808 MHz. The four reference frequencies of group C are 6336 MHz, 6864 MHz, 7392 MHz, and 7920 MHz, and the four reference frequencies of group D are 8448 MHz, 8976 MHz, 9504 MHz, and 10032 MHz. The frequency sub-bands included in group B are overlapped with the frequency bands occupied by current wireless LANs, and it is impossible to use the frequency sub-bands included in the group D in view of the level of current technologies. Accordingly, methods are being currently discussed to use the frequency sub-bands of group A and the frequency sub-bands of group C.

Seven reference frequencies have to be produced to use the three frequency sub-bands of group A and the four frequency sub-bands of the group C. That is, a structure is needed to produce the seven reference frequencies in order to use the three frequency sub-bands of group A and the four frequency sub-bands of group C.

The communication system generates a radio frequency (RF) by use of an intermediate frequency (IF) and the reference frequencies of a local oscillator (LO) in order to transmit data, and transmits data by use of the generated radio frequency. The seven reference frequencies are generated in the local oscillator. Hereinafter, the local oscillator is described to generate the seven reference frequencies.

FIG. 2 is a view for showing local oscillators for generating the seven reference frequencies. As shown in FIG. 2, seven local oscillators are needed to generate the seven reference frequencies. That is, one local oscillator generates only one reference frequency. Phase locked loops (PLLs) work to stabilize the reference frequencies generated from the local oscillators. Thus, it is structured to have one local oscillator corresponding to one PLL. Hereinafter, a process for generating the seven reference frequencies is described by use of FIG. 2.

The local oscillator 200 generates a reference frequency 3432 MHz, and the local oscillator 201 generates a reference frequency 3960 MHz. The local oscillator 206 generates a reference frequency 7920 MHz. The PLL 210 stabilizes the reference frequency generated from the local oscillator 200, and then transmits the reference frequency to the selection unit 220. The PLL 211 stabilizes a reference frequency generated from the local oscillator 201, and then transmits the reference frequency to the selection unit 220. The PLL 216 stabilizes a reference frequency generated from the local oscillator 206, and then transmits the reference frequency to the selection unit 220. The selection unit 220 selects one of the stabilized reference frequencies transmitted according to a control signal, and outputs the selected reference frequency. The reference frequency outputted from the selection unit 220 is combined with the IF signal, and then converted to the RF signal.

Seven local oscillators require seven PLLs in order to generate the seven reference signals as shown in FIG. 2. However, the local oscillators and PLLs have a disadvantage of having a high power consumption. Furthermore, the local oscillators and PLLs have a disadvantage of increasing the size of a communication system.

SUMMARY OF THE INVENTION

The present invention has been developed in order to solve the above drawbacks and other problems associated with the aforementioned local oscillator arrangement. An aspect of the present invention is to provide an apparatus and method minimizing the number of components for generating frequencies to be used in an ultra wide band.

Another aspect of the present invention is to provide an apparatus and method which minimizes power consumption in components for generating frequencies to be used in ultra wide band communications.

Yet anther aspect of the present invention is to provide apparatus and method for setting up components to operate in a way corresponding to a frequency to be generated.

The foregoing and other objects and advantages are substantially realized by providing a reference frequency generation method for communication systems transmitting and receiving data by use of an ultra wide band of at least two frequency groups having at least two reference frequencies, comprising steps of generating generation frequencies by using a frequency transmitted from a local oscillator and adjustment frequencies for adjusting the generation frequencies; selecting one generation frequency and one adjustment frequency out of the generation frequencies and adjustment frequencies; and generating the reference frequencies by using the selected generation frequency and adjustment frequency.

Another aspect of the present invention is to provide a reference frequency generation apparatus for communication systems transmitting and receiving data by use of a ultra wide band of at least two frequency groups having at least two reference frequencies, comprising a local oscillator; a generation frequency-generating part which generates generation frequencies by use of a frequency generated from the local oscillator; an adjustment frequency-generating part which generates adjustment frequencies for adjusting the generation frequency; a selection unit which selects one generation frequency and one adjustment frequency out of the generation frequencies and adjustment frequencies; and a mixer which generates the reference frequencies by use of the selected generation frequency and adjustment frequency.

DETAILED DESCRIPTION OF THE PREFERRED EMBODIMENTS

Figure 3:
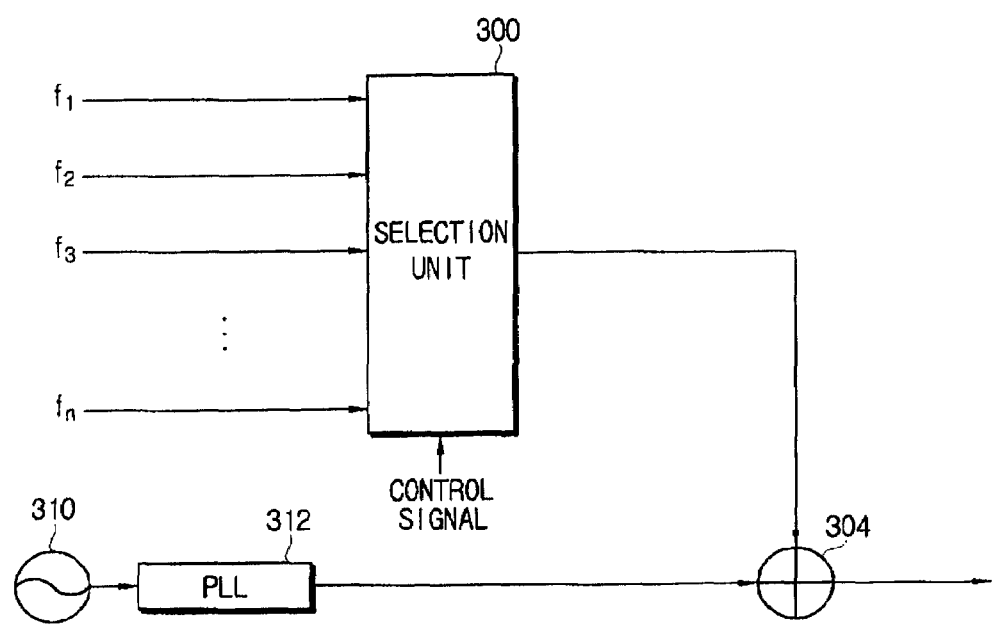
FIG. 3 is a view for showing a process for generating plural reference frequencies to be used in an ultra wide frequency band according to an exemplary embodiment of the present invention.

FIG. 3 is a view for showing a structure for generating reference frequencies according to an exemplary embodiment of the present invention. FIG. 3 shows one local oscillator and one PLL used to generate plural reference frequencies. Hereinafter, description will be made on a process for generating reference frequencies according to an exemplary embodiment of the present invention with reference to FIG. 3. A frequency of an LO signal generated from a local oscillator 310 is hereinafter referred to as a generation frequency. The local oscillator 310 generates an LO signal having a generation frequency. The generation frequency from the local oscillator 310 will be described later. The LO signal from the local oscillator 310 carries out a process for stabilizing a frequency in a PLL 312. The LO signal after the stabilization process is transmitted to the computation unit 304.

The selection unit 300 receives IF signals of plural adjustment frequencies. The number of the IF signals transmitted to the selection unit 300 can differ depending on user's setting. As a user needs n reference frequencies, the number of the adjustment frequencies transmitted to the selection unit 300 becomes n. Further, the number of adjustment frequencies can be changed depending on the number of generation frequencies transmitted to the selection unit 300. That is, as the number of generation frequencies increases, the number of adjustment frequencies transmitted to the selection unit 300 decreases. If a user needs n reference frequencies, the user can increase the number of adjustment frequencies or the number of generation frequencies. FIG. 3 shows that n adjustment frequencies are transmitted to the selection unit 300. The n adjustment frequencies are denoted as $f_1$ to $f_n$. The selection unit 300 selects one of the adjustment frequencies transmitted according to a control signal. The selection unit 300 transmits the selected adjustment frequency to the computation unit 304. The computation unit 304 generates a reference frequency the user wants by use of the transmitted generation and adjustment frequencies. That is, a different control signal is transmitted to the selection unit 300 depending on a reference frequency the user wants to generate.

Figure 1:
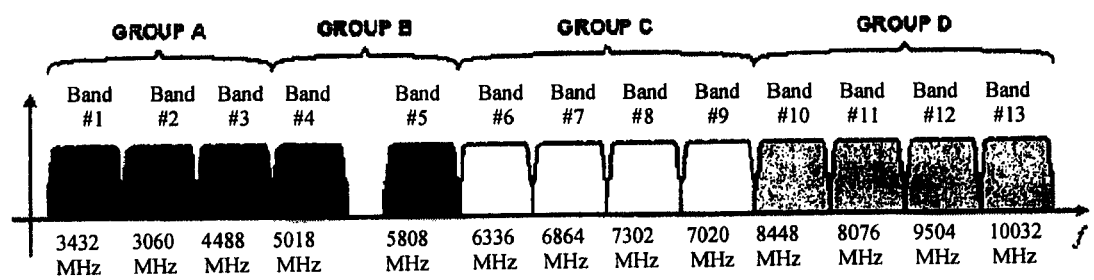
FIG. 1 is a view for showing a structure of an ultra wide frequency band.
Figure 2:
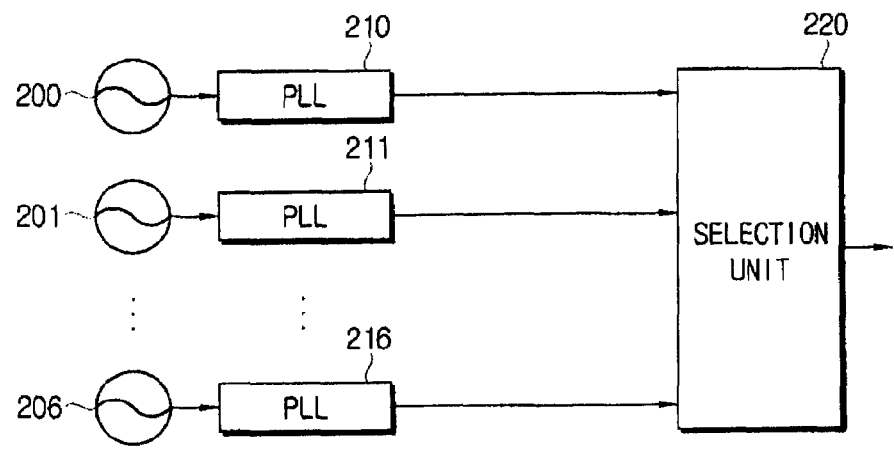
FIG. 2 is a block diagram for generating plural reference frequencies to be used in the ultra wide frequency band.
Figure 4:
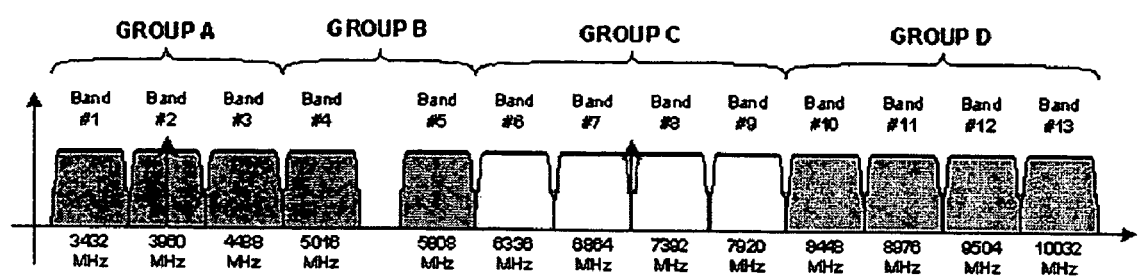
FIG. 4 is a view for showing reference frequencies according to the exemplary embodiment of the present invention.

Description will be made on the generation and adjustment frequencies with reference to FIG. 4. Frequency sub-bands and reference frequencies shown in FIG. 4 are assumed to be the same as the frequency sub-bands and reference frequencies shown in FIG. 1. Table 1 below shows frequency sub-bands and reference frequencies of individual groups shown in FIG. 4.

TABLE 1

|  | Group A | Group B | Group C | Group D |
|---|---|---|---|---|
| Reference frequencies | 3432 | 5016 | 6336 | 8448 |
|  | 3960 | 5808 | 6864 | 8976 |
|  | 4488 |  | 7392 | 9504 |
|  |  |  | 7920 | 10032 |

The unit of MHz is used for the reference frequencies. As stated above, it is assumed to generate the reference frequencies of Group A and the reference frequencies of Group C. In order to generate the reference frequencies of Group A and the reference frequencies of Group C, seven reference frequencies have to be generated. Hereinafter, description will be made on an occasion in which one generation frequency to be used for Group A and one generation frequency to be used for Group C are generated. In FIG. 3, two local oscillators and PLLs are needed to generate the two generation frequencies, but, an occasion will be described below in which the two generation frequencies are generated by use of one local oscillator and one PLL.

Figure 5:
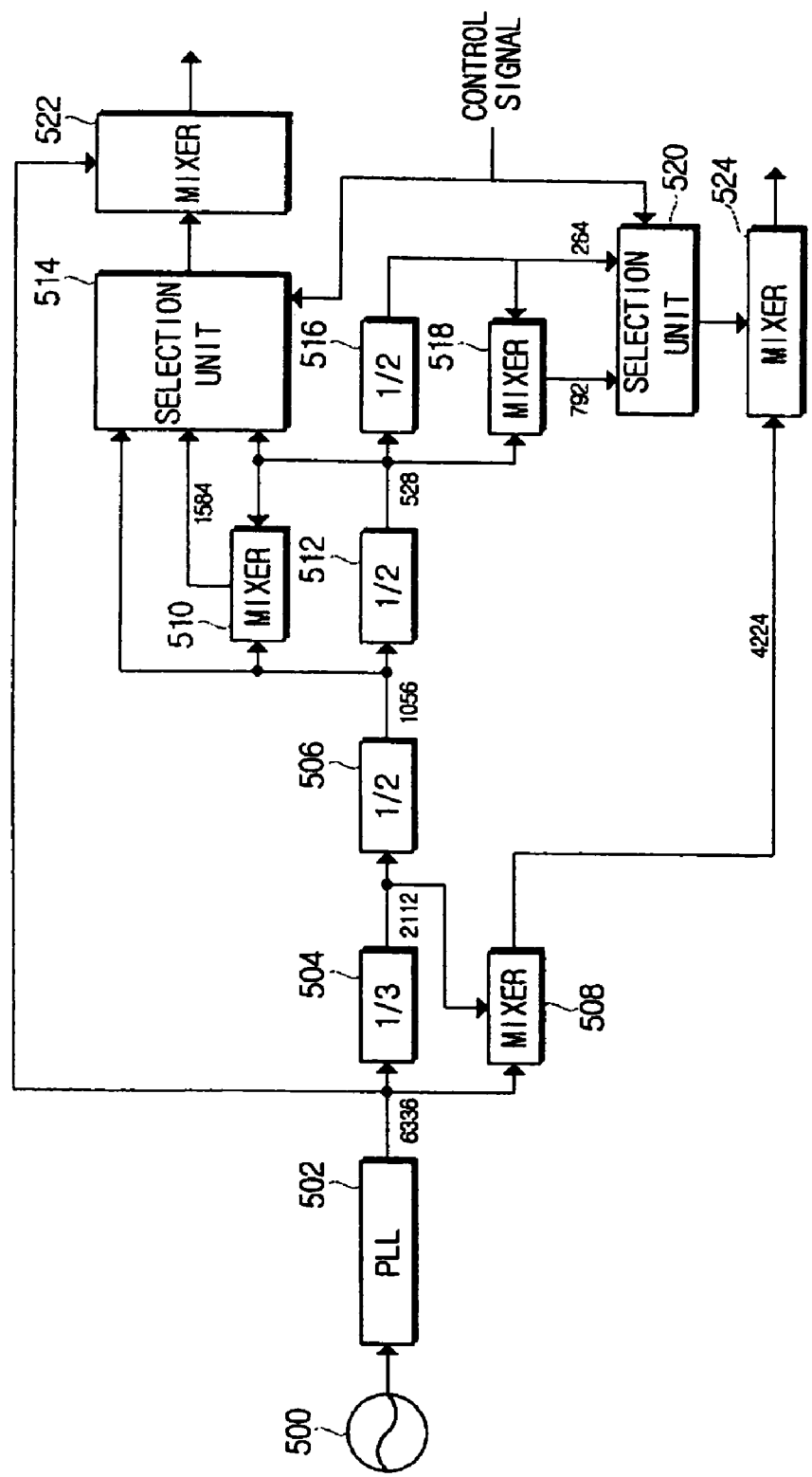
FIG. 5 is a view for showing a process for generating reference frequencies by using a generation frequency and an adjustment frequency according to another exemplary embodiment of the present invention.

FIG. 5 is a view for showing an exemplary circuit for generating the two generation frequencies by use of one local oscillator and one PLL and generating a reference frequency by use of the generated generation frequencies and adjustment frequencies. Hereinafter, description will be made on a process for generating plural reference frequencies by use of one local oscillator and one PLL with reference to FIG. 5 according to another exemplary embodiment of the present invention.

A local oscillator 500 generates a frequency of 6336 MHz. The generated frequency causes a PLL 502 to perform a frequency stabilization process. A frequency outputted from the PLL 502 is transmitted to two mixers 508 and 522 and a divider 504. The divider 504 performs division computation with respect to the transmitted frequency. The divider 504 divides the transmitted frequency by 3. By carrying out the division computation, the divider 504 generates a frequency of 2112 MHz. The generated frequency of 2112 MHz is transmitted to a divider 506 and the mixer 508. The divider 506 carries out division computation with respect to the transmitted frequency of 2112 MHz. The division computation divides the transmitted frequency by 2. With the division computation carried out, the divider 506 generates a frequency of 1056 MHz. The mixer 508 mixes a frequency of 6336 MHz transmitted from the PLL 502 and a frequency of 2112 MHz transmitted from the divider 504. The mixer 508 outputs a difference between the frequencies of 6336 MHz and 2112 MHz. A signal outputted from the mixer 508 has a frequency of 4224 MHz. The frequency of 6336 MHz outputted from the PLL 502 and the frequency of 4224 MHz outputted from the mixer 508 become the generation frequencies.

Hereinafter, description will be made on a process for generating the adjustment frequency. The frequency outputted from the divider 506 is transmitted to a selection unit 514, mixer 510, and divider 512. The divider 512 carries out division computation with respect to the transmitted frequency of 1056 MHz. The division computation is to divide the transmitted frequency by 2. The division computation generates a frequency of 528 MHz. The divider 512 transmits the frequency of 512 MHz to the divider 516, mixers 510 and 518, and selection unit 514. The mixer 510 mixes the frequency of 1056 MHz transmitted from the divider 506 and the frequency of 528 MHz transmitted from the divider 512. Such mixing process generates a frequency of 1584 MHz, and the generated frequency of 1584 MHz is transmitted to the selection unit 514. The frequencies transmitted from the selection unit 514 become an adjustment frequency for Group C. The selection unit 514 selects (or may not select) one of the transmitted adjustment frequencies according to a control signal. The selected adjustment frequency is transmitted to the mixer 522. The mixer 522 performs a mixing process by using the adjustment frequency transmitted from the selection unit 514 and the generation frequency from the PLL 502. Such a mixing process generates one reference frequency, and the mixer 522 outputs a generated reference frequency.

If the mixer 522 does not receive anything from the selection unit 514, the mixer 522 generates a frequency of 6336 MHz, and, if the mixer 522 receives a frequency of 528 MHz, the mixer 522 generates a frequency of 6864 MHz. If the mixer 522 receives a frequency of 1056 MHz from the selection unit 514, the mixer 522 generates a frequency of 7392 MHz, and, if the mixer 522 receives a frequency of 1584 MHz from the selection unit 514, the mixer 522 generates a frequency of 7920 MHz.

The divider 516 performs division computation with respect to the frequency of 528 MHz transmitted. The division computation divides the transmitted frequency by 2. Such a division computation generates a frequency of 264 MHz. The divider 516 transmits the generated frequency of 264 MHz to the mixer 518 and the selection unit 520. The mixer 518 performs a mixing process with respect to the frequency of 528 MHz transmitted from the divider 512 and the frequency of 264 MHz transmitted from the divider 516. The mixer 518 generates a frequency of 792 MHz by performing such a mixing process, and transmits the generated frequency of 792 MHz to the selection unit 520.

The frequencies transmitted from the selection unit 520 become adjustment frequencies with respect to Group A. The selection unit 520 selects one of the adjustment frequencies transmitted according to the control signal, and transmits the selected adjustment frequency to the mixer 524. The mixer 524 performs a mixing process by using the adjustment frequency transmitted from the selection unit 520 and the generation frequency transmitted from the mixer 508. Such a mixing process generates one reference frequency, and the mixer 524 outputs the generated reference frequency.

If the mixer 524 receives a frequency of 264 MHz from the selection unit 520, the mixer 524 generates a frequency of 3960 MHz or 4488 MHz. If the mixer 524 receives a frequency of 792 MHz from the selection unit 520, the mixer 524 generates a frequency of 3432 MHz. By performing the mixing process as shown in FIG. 5, the reference frequencies included in Groups A and C can be generated. However, FIG. 5 shows that five mixers are used to generate the seven reference frequencies. Therefore, a method is necessary to reduce the number of mixers necessary to generate the seven reference frequencies. FIG. 4 is referred to for re-establishing generation frequencies and adjustment frequencies in order to reduce the number of mixers, which will be hereinafter described.

One generation frequency and one adjustment frequency are established to generate a reference frequency of Group A shown in FIG. 4. If a generation frequency of 3960 MHz is established, an adjustment frequency is obtained by using a difference between the generation frequency and the reference frequency. A difference between the reference frequency and the generation frequency included in Group A is 528 MHz. Therefore, the adjustment frequency used in the Group A becomes 528 MHz.

If one generation frequency is used to generate reference frequencies in Group C, two adjustment frequencies are necessary. If a generation frequency of 7128 MHz is used for the Group C, the adjustment frequencies become 264 MHz and 792 MHz. Table 2 below shows the generation frequencies and the adjustment frequencies included in the Group A and the Group C shown in FIG. 4. The unit of MHz is used for the generation and adjustment frequencies in Table 2.

TABLE 2

|  | Group A | Group C |
|---|---|---|
| Generation frequencies | 3960 | 7128 |
| Adjustment frequencies | 528 | 264, 792 |

As shown in FIG. 5, however, a plurality of dividers and a plurality of mixers are required to generate reference frequencies. Therefore, it is required to reduce the number of dividers and the mixers necessary for generating the reference frequencies.

Figure 6:
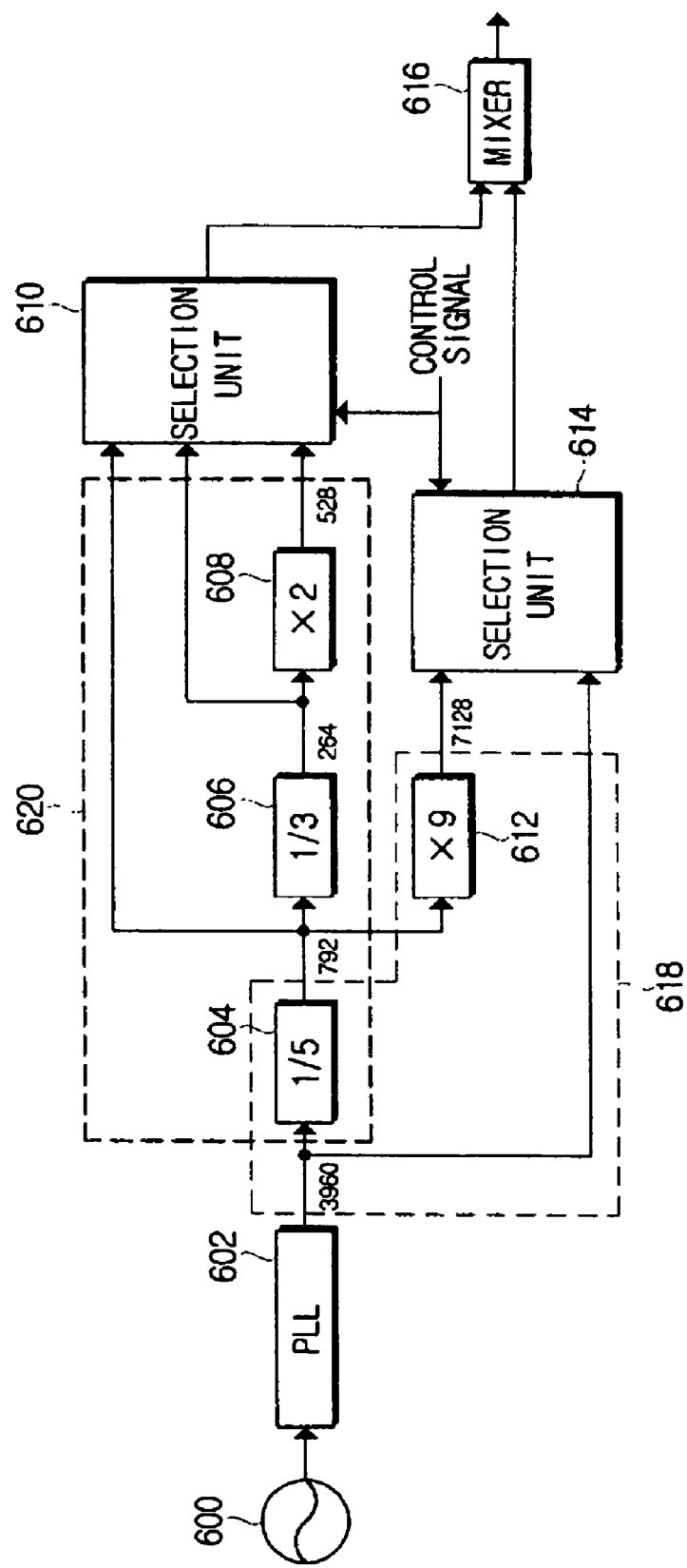
FIG. 6 is a view for showing an improved process according to yet another exemplary embodiment of the present invention.

FIG. 6 shows an improved process according to yet another exemplary embodiment of the present invention. In FIG. 6, one local oscillator and one PLL are used in order to generate two generation frequencies, and reference frequencies are generated by use of the generated generation frequencies and adjustment frequencies.

The local oscillator 600 generates a frequency of 3960 MHz. The generated frequency performs a frequency stabilization process in a PLL 602. A frequency outputted from the PLL 602 is transmitted to a divider 604 and a selection unit 614. The divider 604 performs a division computation with respect to the transmitted frequencies. The divider 604 divides the transmitted frequency by 5. Such a division computation causes the divider 604 to generate a frequency of 792 MHz. The generated frequency of 792 MHz is transmitted to a selection unit 610, multiplier 612, and divider 606. The multiplier 612 performs multiplication computation with respect to the transmitted frequency of 792 MHz. Such a multiplication computation multiplies the transmitted frequency by 9. Such a multiplication computation causes the multiplier 612 to generate a frequency of 7128 MHz. The multiplier 612 transmits the generated frequency of 7128 MHz to the selection unit 614. The frequencies transmitted to the selection unit 614 become generation frequencies. The configuration for generating the generation frequencies is referred to as a generation frequency-generating part 618. The selection unit 614 selects one frequency according to a control signal, and transmits the selected frequency to a mixer 616. However, a frequency of 3960 MHz outputted from the PLL 602 can be used as a reference frequency without any processing. Hereinafter, description will be made on a process for generating adjustment frequencies. The configuration for generating the adjustment frequencies is referred to as an adjustment frequency-generating part 620.

The divider 606 performs division computation with respect to a transmitted frequency. The divider 606 divides the transmitted frequency by 3. Such a division computation causes the divider 606 to generate a frequency of 264 MHz. The generated frequency of 264 MHz is transmitted to the multiplier 608 and the selection unit 610. The multiplier 608 performs multiplication computation with respect to the transmitted frequency of 264 MHz. The multiplication computation multiplies the transmitted frequency by 2. The multiplication computation causes the multiplier 608 to generate a frequency of 528 MHz. The multiplier 608 transmits the frequency of 528 MHz to the selection unit 610. The frequencies transmitted to the selection unit 610 are adjustment frequencies. The selection unit 610 selects one out of the transmitted adjustment frequencies according to the control signal, and transmits the selected adjustment frequency to the mixer 616. The mixer 616 performs a mixing process by using the adjustment frequencies transmitted from the selection unit 610 and the generation frequency transmitted from the selection unit 614. Such a mixing process produces one reference frequency, and the mixer 616 outputs the generated reference frequency.

Hereinafter, description will be made on a process for generating a reference frequency included in Group A. When the selection unit 614 selects a generation frequency of 3960 MHz and the selected generation frequency is transmitted to the mixer 616, the selection unit 610 selects an adjustment frequency of 528 MHz and transmits the selected adjustment frequency to the mixer 616. The mixer 616 performs a mixing process by using the transmitted generation frequency and adjustment frequency. Such a mixing process causes the mixer 616 to generate reference frequencies of 3432 MHz, 3960 MHz, and 4488 MHz.

When the selection unit 614 selects a generation frequency of 7128 MHz and transmits the selected generation frequency to the mixer 616, the selected unit 610 may select an adjustment frequency of 264 MHz and transmit the selected adjustment frequency to the mixer 616. The mixer 616 performs a mixing process by using the transmitted generation frequency and adjustment frequency. Such a mixing process causes the mixer 616 to generate reference frequencies of 6864 MHz and 7392 MHz.

When the selection unit 614 selects a generation frequency of 7128 MHz and transmits the selected generation frequency to the mixer 616, the selection unit 610 may select an adjustment frequency of 792 MHz and transmit the selected adjustment frequency to the mixer 616. The mixer 616 performs a mixing process by using the transmitted generation frequency and adjustment frequency. Such a mixing process causes the mixer 616 to generate reference frequencies of 6336 MHz and 7920 MHz. Table 3 below shows relationships between the selected generation frequency and adjustment frequency. The unit of MHz is used in Table 3 for generation frequencies, adjustment frequencies, and reference frequencies.

TABLE 3

| Generation frequencies | Adjustment frequencies | Reference frequencies |
| --- | --- | --- |
| 3960 | 528 | 3432, 3960, 4480 |
| 7128 | 264 | 6864, 7392 |
| 7128 | 792 | 6336, 7920 |

As described above, FIG. 6 shows that the number of mixers is remarkably reduced when compared to the process of FIG. 5.

FIG. 5 and FIG. 6 are views for explaining operations of respective units and parts for generating specific frequencies. However, if different reference frequencies are desired to be generated, the operations of the multipliers and dividers in FIG. 5 and FIG. 6 should be changed. That is, the multipliers and dividers shown in FIG. 5 and FIG. 6 may have different operations. In addition, it is obvious that the multipliers and dividers can have different multiplication coefficients and division coefficients according to the changes of reference frequencies to be generated. The frequency generated by the local oscillator may also be varied.

As aforementioned, the present invention remarkably reduces the number of units or parts necessary for generating plural reference frequencies to be used for ultra wide band frequencies. The remarkable reduction of the number of units or parts enables the power consumption of a communication system to be minimized. Further, the size of the communication system can be reduced according to the remarkable reduction of the number of components.

What is claimed is:

1. A reference frequency generation method for communication systems transmitting and receiving data by use of an ultra wide band of at least two frequency groups having at least two reference frequencies, the method comprising:
generating generation frequencies by using a frequency generated from a local oscillator and adjustment frequencies for adjusting the generation frequencies;
selecting one generation frequency and one adjustment frequency out of the generation frequencies and adjustment frequencies; and
generating the reference frequencies by using the selected generation frequency and adjustment frequency,
wherein the adjustment frequencies correspond to differences between the respective generation frequencies and the respective reference frequencies.

2. The method as claimed in claim 1, wherein the reference frequencies are 3432 MHz, 3960 MHz, 4488 MHz, 6336 MHz, 6864 MHz, 7392 MHz, and 7920 MHz.

3. The method as claimed in claim 1, wherein the frequency generated from the local oscillator is 3960 MHz.

4. The method as claimed in claim 1, wherein the generation frequencies are 3960 MHz and 7128 MHz.

5. The method as claimed in claim 4, wherein the 3960 MHz generation frequency is generated from the local oscillator and the 7128 MHz generation frequency is generated by dividing the frequency generated from the local oscillator by 5 and multiplying the divided result by 9.

6. The method as claimed in claim 4, wherein adjustment frequencies for adjusting the 7128 MHz generation frequency are 264 MHz and 792 MHz, and an adjustment frequency for adjusting the 3960 MHz is 528 MHz.

7. The method as claimed in claim 6, wherein the 792 MHz adjustment frequency is obtained by dividing a frequency generated from the local oscillator by 5, the 264 MHz adjustment frequency is obtained by dividing the 792

MHz adjustment frequency by 3, and the 528 MHz adjustment frequency is obtained by multiplying the 264 MHz adjustment frequency by 2.

8. A reference frequency generation apparatus for communication systems transmitting and receiving data by use of an ultra wide band of at least two frequency groups having at least two reference frequencies, comprising:
   a local oscillator;
   a generation frequency-generating part which generates generation frequencies using a frequency generated from the local oscillator;
   an adjustment frequency-generating part which generates adjustment frequencies for adjusting the generation frequencies;
   a first section unit which selects one adjustment frequency from the adjustment frequencies; a second selection unit which selects one generation frequency from the generation frequencies; and
   a mixer which generates the reference frequencies using the selected generation frequency and adjustment frequency,
   wherein the adjustment frequencies correspond to differences between the respective generation frequencies and the respective reference frequencies.

9. The apparatus as claimed in claim 8, wherein the reference frequencies are 3432 MHz, 3960 MHz, 4488 MHz, 6336 MHz, 6864 MHz, 7392 MHz, and 7920 MHz.

10. The apparatus as claimed in claim 8, wherein the local oscillator generates a frequency of 3960 MHz.

11. The apparatus as claimed in claim 10, wherein the generation frequency-generating part generates generation frequencies of 3960 MHz and 7128 MHz.

12. The apparatus as claimed in claim 11, wherein the adjustment frequency-generating part generates an adjustment frequencies of 528 MHz to adjust a generation frequency of 3960 MHz.

13. The apparatus as claimed in claim 12, wherein the adjustment frequency-generating part generates adjustment frequencies of 264 MHz and 792 MHz to adjust a generation frequency of 7128 MHz.

14. A reference frequency generation apparatus for communication systems transmitting and receiving data by use of an ultra wide band of at least two frequency groups having at least two reference frequencies, comprising:
   a local oscillator;
   a generation frequency-generating part which generates generation frequencies using a frequency generated from the local oscillator;
   an adjustment frequency-generating part which generates adjustment frequencies for adjusting the generation frequencies;
   a first selection unit which selects a generation frequency from the generation frequencies;
   a second selection unit which selects an adjustment frequency from the adjustment frequencies; and
   a mixer which generates the reference frequencies using the generation frequency selected by the first selection unit and the adjustment frequency selected by the second selection unit.

* * * * *